United States Patent [19]
Kuboshima

[11] 4,072,971
[45] Feb. 7, 1978

[54] FOCUS ADJUSTMENT AND DETERMINATION MEANS

[75] Inventor: Makoto Kuboshima, Minami-ashigara, Japan

[73] Assignee: Fuji Photo Film Co., Ltd., Minami-ashigara, Japan

[21] Appl. No.: 603,225

[22] Filed: Aug. 8, 1975

[30] Foreign Application Priority Data

Aug. 14, 1974 Japan ................................ 49-93595

[51] Int. Cl.² .............................................. G03B 3/00
[52] U.S. Cl. ..................................... 354/201; 354/199
[58] Field of Search ............... 354/195, 197, 199, 200, 354/201, 219, 224, 225, 25

[56] References Cited

U.S. PATENT DOCUMENTS

| | | | |
|---|---|---|---|
| 834,089 | 10/1906 | Wallace | 354/201 |
| 1,178,478 | 4/1916 | Becker | 354/199 |
| 1,319,749 | 10/1919 | Becker | 354/199 |
| 1,494,724 | 5/1924 | Verschraeghen | 354/201 |
| 1,501,295 | 7/1924 | Wilson | 354/201 |
| 1,583,706 | 5/1926 | Tessier | 354/199 |
| 1,906,059 | 4/1933 | Hadaway | 354/197 |
| 1,998,568 | 4/1935 | Barenyi | 354/201 |
| 2,169,688 | 8/1939 | Frotschner | 354/219 |
| 2,173,553 | 9/1939 | Graf | 354/200 |
| 2,327,859 | 8/1943 | Bolsey | 354/199 |
| 2,945,419 | 7/1960 | Bechtold et al. | 354/199 |
| 3,143,052 | 8/1964 | Weiss et al. | 354/201 |
| 3,194,139 | 7/1965 | Babcock | 354/199 |
| 3,683,777 | 8/1972 | Miyagawa | 354/25 |

*Primary Examiner*—Joseph W. Hartary
*Assistant Examiner*—Alan Mathews
*Attorney, Agent, or Firm*—Sughrue, Rothwell, Mion, Zinn and Macpeak

[57] ABSTRACT

Focus adjustment and determination means wherein viewfinder and taking optical systems are positioned in close proximity and are displaced simultaneously by amounts proportional to their focal lengths.

12 Claims, 5 Drawing Figures

FOCUS ADJUSTMENT AND DETERMINATION MEANS

BACKGROUND OF THE INVENTION

The present invention relates to a focusing device for a photographic camera. More particularly, the invention relates to a focus device suitable for use in a photographic camera of a type generally referred to as an auto-process camera.

The so-called auto-process camera employs film units each of which comprises at least a photosensitive sheet exposable to form a latent image of an object to be photographed and transfer sheet on which a positive, viewable image may be produced in a known diffusion-transfer process in which a processing solution normally contained in a breakable pod or pods attached to the film unit, spreads in between the photosensitive sheet and the transfer sheet as the film unit passes through a gap between pressing rolls inside the camera subsequent to exposure of the photosensitive sheet. A photographic print, that is, a developed version of the film unit ejected from the body of the photographic camera, has a relatively large size, for example 80 mm. × 70 mm. and is available in a short time after each exposure. Such a camera offers the advantages that it is not necessary for the photographer to proceed to a special establishment for development of film, and also that it is possible to know immediately whether or not a photographic picture has been taken in a desired manner. However, a main disadvantage associated with an auto-process camera is that the camera is comparatively large and bulky, because extra elements for film unit processing and transportation within the body of the camera must be provided therein and also since the camera must accommodate film units each being of a size substantially equal to the size of the final print. Accordingly, it has been a desideratum to reduce the size of the auto-process camera.

A particular aspect of auto-process construction requiring an improvement to be done is a focusing device. The focusing device employed hitherto has generally resulted in increase of the size of the camera. A first problem associated with the focusing device is the location of a viewfinder which forms a part of the focusing device. If, for example, the camera is equipped with a range viewfinder of a type having a range indicator operable in response to forward or rearward movement of the photographic optical system of the camera, there is the inconvenience that the viewfinder is liable to be blocked when a processed film unit is forwarded out of the camera. To avoid this problem it has been known to locate the viewfinder at one side of the body of the camera where it cannot be blocked by film units. However, such a construction has the disadvantage that the camera becomes larger and is somewhat unbalanced, and also that the viewfinder involves a problem of parallax.

To avoid the parallax it has been known to provide an auto-process camera with a through-the-lens viewfinder in combination with a pivotally supported mirror. However, it is known that there are frequently mechanical problems associated with such a mirror, and also since the mirror must have a size comparable with the format of the ultimate photographic print undue amount of space must be made available to accommodate the mirror and permit the reciprocal pivotal motion thereof. This means that the camera becomes even bulkier.

SUMMARY OF THE INVENTION

It is accordingly a principal object of the present invention to provide a focusing device for a photographic camera which is compact.

It is a further object of the invention to provide a focusing device which may be advantageously employed in an auto-process camera.

It is a still further object of the invention to provide a focusing device for a photographic camera which is of simple construction and is easy to manipulate.

In accomplishing these and other objects there is provided, according to the present invention, a focusing device comprising a taking optical system i.e., an optical lens system for direction of image-wise light onto a photosensitive film surface, which includes a fixed rear lens assembly and a forward lens assembly moveable parallel to the optical axis of the system and a finding optical system i.e., an optical system for direction of light from an object to be photographed to an eyepiece or screen viewable by the photographer. The finding optical system has a focal length less than that of the taking optical system and has an optical axis extending in parallel relation to and near to that of the taking optical system. Light directed into a view finder compartment along the finding optical system may be relayed by a suitable lens assembly, towards a suitable eyepiece for eye-level viewing, or towards a focusing screen for waist-level viewing, this latter mode being particularly suitable in association with an auto-process camera in which processed film units are moved upwards out of the camera via a rear portion thereof. Respective front lens assemblies of the finding optical system and the taking optical system are moved forwards or rearwards simultaneously and are displaced by related amounts. These respective front lens assemblies of the finding optical system and the taking optical system may have equal or different focal lengths. In the former case, they are always moved equal amounts, are slideable in simple sleeves, and are both fixedly mounted in integrally connected carrier means which are moveable forwards or rearwards by manually actuable screw or lever means provided on the exterior of the camera. In the latter case, they are mounted in draw tube elements, for example, and are connected by suitable gears which maintain the degree of rotation of the draw tube assembly of, and hence the amount of displacement of the finding optical system to those of the forward lens assembly of the taking optical system. In this manner, the focusing positions of the finding optical system and taking optical system are always in an exact relation to one another, and a photographer may easily determine whether an object to be photographed is held in correct focus. While the operations of the focusing device is simple, the focusing device is compact, and therefore, requires little space, thus permitting reduction of camera size. In addition thereto, the occurrence of parallax is also avoided since the finding and taking optical systems are close to one another. Although the focusing device of the invention is of special advantage when employed in an auto-process camera, it is of course equally well suited to employment in other types of camera.

BRIEF DESCRIPTION OF THE DRAWINGS

A better understanding of the present invention may be had from the following full description of several preferred embodiments thereof when read in reference to the attached drawings, in which.

Before the description of the present invention proceeds, it is to be noted that like parts are designated by like reference numerals throughout the accompanying drawings.

DESCRIPTION OF THE PREFERRED EMBODIMENTS

Figure 1:
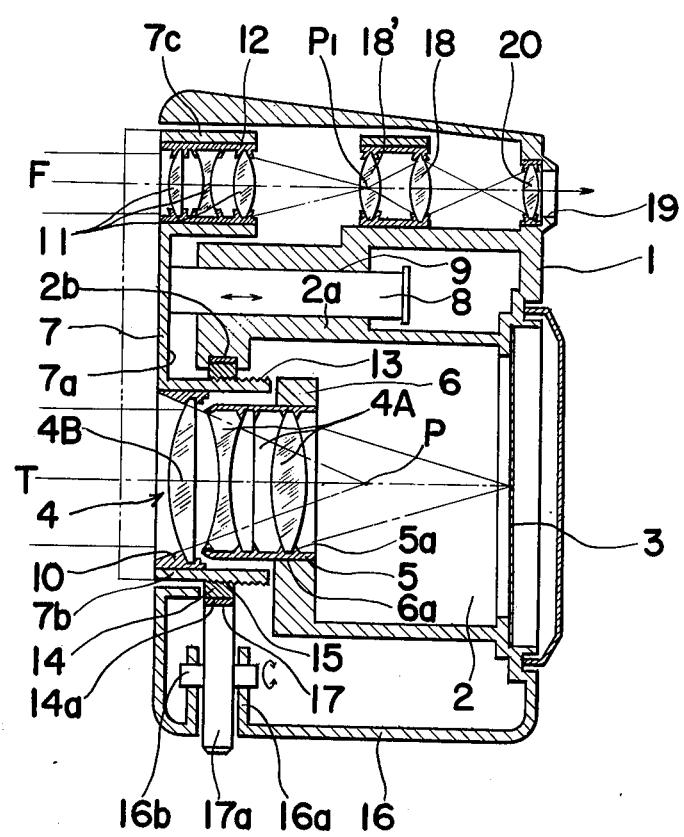
FIG. 1 is a side cross-sectional view of a camera having provided therein a focusing device according to a first embodiment of the invention.

Referring first to FIG. 1, there is shown in section a camera 1 which defines an internal, lightproof chamber 2 having a rear wall portion constituting an exposure station whereat photosensitive film material 3 for production of a photograph may be held by a conventional means not shown in a correct position for exposure to image-wise light reflected from an external object. Such image-wise light may be directed onto the film material 3 by a first, taking optical system 4 comprising a fixed rear lens assembly 4A and a front lens assembly 4B, which may be moved forwardly or rearwardly with respect to the fixed rear lens assembly 4A in a manner more fully described below, whereby images carried by light reflected from the object to be photographed may be correctly focussed at the plane of the film material 3, the optical axis T of the taking optical system remaining in line with a central point of the film material 3 during movement of the forward lens assembly 4B. The rear lens assembly 4A comprises one or more lenses which are fitted and cemented in groove portions 5a defined at the interior of tubular holder 5. The holder 5 extends in a front to rear alignment and has a rear end portion fixedly attached to a wall portion 6 which constitutes a front end portion of the chamber 2 and defines an opening 6a through which light may be directed by the taking optical system 4 into the chamber 2. Provided in association with the first optical system 4 is a known shutter means, not shown, which normally prevents entry of light into the chamber 2 and may be actuated to permit exposure of the film material 3. The front lens assembly 4B comprises one or more lenses which are fitted and cemented in groove portions 10 defined in the interior of a carrier 7b.

The carrier 7b is a tubular means extending in a front to rear alignment and having a front end intergrally connected to a connection board 7 which has a plane lying perpendicularly to the optical axis T of the taking optical system 4 and generally parallel to the plane of film material 3 at the exposure station. A guide shaft 8 is slidably supported without play in a bearing portion 9 defined in a fixed portion of the camera interior, for example, in an upper extension of the top wall 2a of the chamber. The shaft has a front end fixed to the rear surface 7a of the connection board 7. The shaft 8 serves to keep the first and second carriers 7b and 7c, which are connected with each other by means of the connection board 7, in alignment with the respective optical axes T and F which extend in parallel relation to each other, during the movement of said shaft 8.

The tubular carrier 7b has an outer peripheral surface formed with a helical thread 13 which extends from the rear end thereof to a position substantially intermediate of the length of the carrier 7b. Around the carrier 7b there is provided a guide ring 14 which is disposed symmetrically about and normal to the optical axis T and is accommodated in a channel 2b formed in a camera interior wall portion fixedly attached to the upper wall 2a of the chamber 2. The channel 2b encloses the entire outer periphery portion of the ring 14 except for a lower portion thereof, and permits rotatory movement of the ring 14, but not movement thereof in a direction parallel to the optical axis T. The ring 14 has an inner peripheral surface formed with a helical thread 15 engaged to the helical thread 13 defined on the portion of the outer peripheral surface of the carrier 7b. The ring 14 has an outer peripheral surface formed with straight gear teeth 14a through which that portion of the ring 14, which is not enclosed by the channel 2b, is operatively engaged to straight gear teeth 17a defined on the outer pheriphery of a vertically aligned drive wheel 17. This drive wheel 17 is rotatably mounted on a horizontal shaft 16b fixedly supported by upwardly extending portions 16a of a base wall 16 of the camera 1, a portion of which drive wheel 17 is exposed outwardly from the base wall 16 and is accessible to the hand of a photographer. Thus, in accordance with the rotation of the ring 14 incident to manual rotation of the drive wheel 17 the carrier 7b and hence the forward lens assembly 4B and also the connection board 7 may moved axially close towards and away from the plane of the film material 3. Needless to say the drive wheel 17 may be provided in a side portion of the camera 1 and engage a side portion of the ring 14. Forward or rearward movement of the connection board 7 causes simultaneous movement of the second carrier 7c, which is in integral attachment to the upper end portion of the connection board 7, is slidably mounted in an upper, forward portion of the camera 1, and has a shape similar to that of, but a diameter smaller than that of the first carrier 7b.

The inner peripheral surface of the second carrier 7c is formed with groove portions 12 in which are fitted and cemented one or more lenses constituting a second, finding optical system 11. The optical axis F of the second optical system 11 is parallel to the optical axis T of the first optical system 4. Light reflected by the external object may be directed by the second optical system 11 into a chamber 2' defined in the upper part of the camera 1 and be received by a relay optical system which includes a field lens 18' and relay lens assembly 18 fixedly mounted in a generally central portion of the chamber 2'. The relay optical system transmits the light to an eyelens 20 supported in alignments with the optical axis F in an eyepiece 19 defined in the rear wall of the camera 1. Therefore, the image of the object directed into the chamber 2' by the second optical system 11 may be viewed via the eyepiece 19.

Generally, in the taking optical system, the focal length of the front lens assembly is 40–70 % of that of the complete optical system. In this first embodiment of the invention, the focal length P of the front lens assembly 4B is 50 % of that of the first optical system 4 and the focal length P' of the second optical system 11 is made equal to the focal length P. In this arrangement, the focus area of the second optical system 11 is suitably one quarter of that of the area of the exposed film material 3.

Since the connecting board 7 and carriers 7b and 7c are in integral connection with each other the front lens assembly 4B and second optical system 11 are always moved an equal distance upon rotation of the drive wheel 17. Moreover, since the front lens assembly 4B and the second optical system 11 have equal focal lengths, when the object to be photographed is correctly focussed by the second optical system 11 it is also correctly focussed by the front lens assembly 4B. Thus, to take a photograph the photographer looks through the eyepiece 19 while turning the drive wheel 17 in a suitable direction until he ascertains that the image of the object to be photographed is correctly focused. Thereafter he may actuate the camera shutter means, whereupon the image of the object correctly focussed by the forward lens assembly 4B is relayed by the rear lens 4A onto the film material 3. Accurate focus may thus be achieved and correct focus position of the taking optical system be detected in a very straightforward manner. It will also be noted that since the focusing device is very compact, the first optical system 4 and second optical system 11 are close to one another, thereby minimizing the problem of parallax, while at the same time it is made possible to construct a smaller camera.

Figure 2:
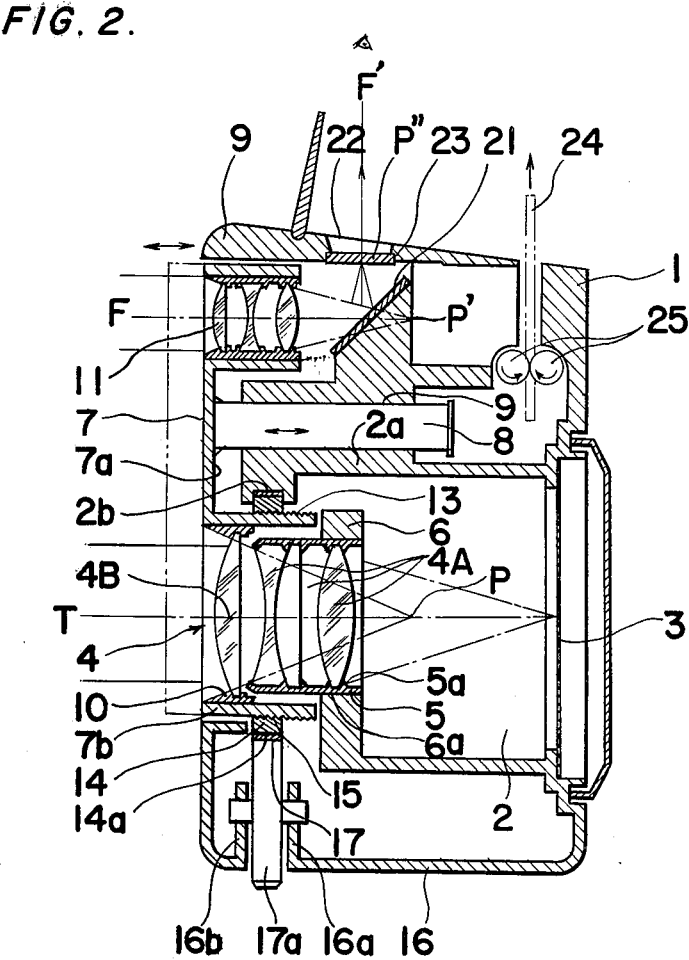
FIG. 2 is a view similar to FIG. 1, showing a second embodiment of the present invention.

If the focusing device of the invention is employed in an auto-process camera which is constructed to permit removal of processed film units upwardly from the rear thereof, there may be employed the modification shown in FIG. 2, to which reference is now had. Construction of this modification is identical to the construction described above except that the chamber 2' does not extend to the rear of the camera 1 and communicates with an exit portion 22 which is formed in the top wall of the camera 1 and in which there is fitted a horizontal focussing screen 23. Light directed into the chamber 2' by the second optical system 11 is received by a reflecting mirror 23 which is mounted on the rear wall of the chamber 2' and is positioned to direct the light upwards at right-angles to the optical axis F and onto the focussing screen 23 whereat the image carried by the light is viewable by a photographer holding the camera 1 at waist-level and looking down. With such a construction, a processed film unit 24 may be moved upwardly and outwardly from the rear of the camera 1 by the pressing rolls 25, for example, as indicated by the chain-dot line in FIG. 2, without any hindrance to viewing the image on the focusing screen 23. The photographer may therefore adjust the focus for taking photographs of different objects while a previously exposed film unit is being processed by the rolls 25 and moved out of the camera.

As noted above, the image viewing area on which the image is focused by the second optical system 11 is one quarter of the corresponding area of the first optical system 4. While this permits a compact construction, it may be desired to permit more precise focus adjustment. In this case the focussing screen 23 may be suitably replaced by a so-called brilliant finder (not shown) which includes centrally positioned Fresnel lenses having a split-image prism and provides an enlarged viewing area.

The construction of FIG. 2 is suitable for larger auto-process cameras in general, even if processed film units are not moved upwardly therefrom, since the focal length of the taking optical system of such a camera is very large, for example, usually 120 mm., and it is difficult to effect satisfactory relay over this distance of the images focused by the finding optical system. This problem is easily overcome by providing a mirror 21 at a position sufficiently near to the second optical system 11 to ensure transmission of a clear image onto the focusing screen 23.

Figure 3:
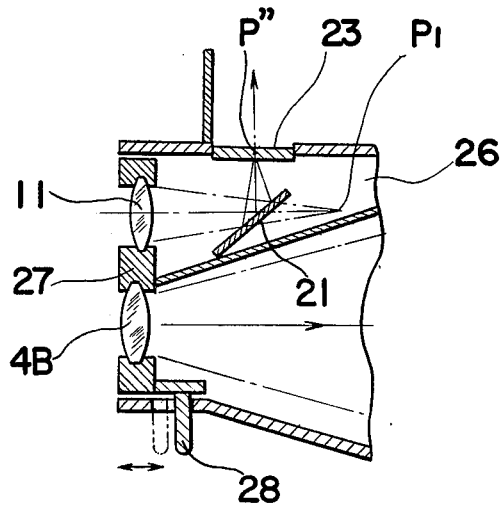
FIG. 3 is a side sectional view of a portion of the camera showing a third embodiment of the present invention.

FIG. 3 shows another modification in which the front lens assembly 4B and second optical system 11 are rigidly held in an integral carrier and guide 27 which is forwardly and rearwardly slidable in the camera front wall portion and is in fixed connection to a lever element 28 which projects downwards to the exterior of the camera, and may be actuated manually to effect movement of the carrier and guide 27.

Figure 4:
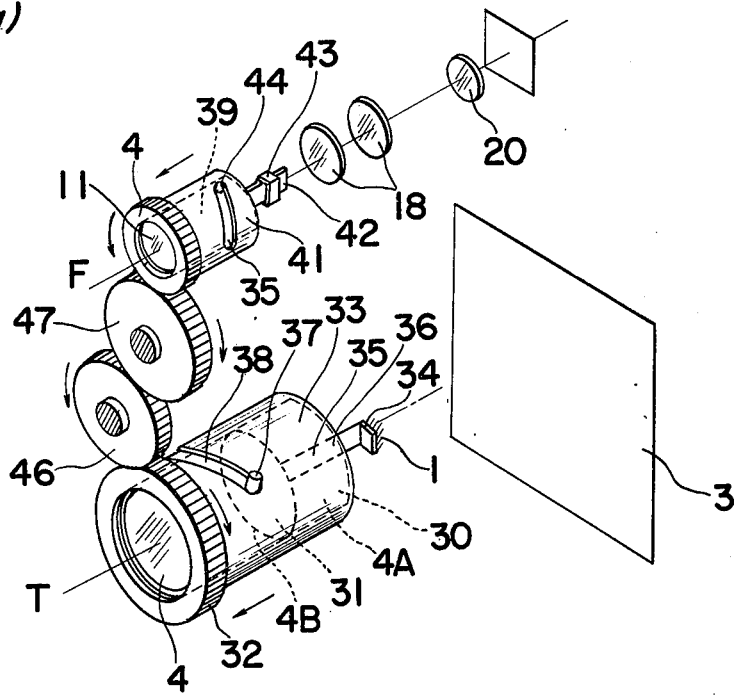
FIGS. 4a and 4b are schematic perspective views of a fourth embodiment of the invention, shown in different operation positions.
Figure 4:
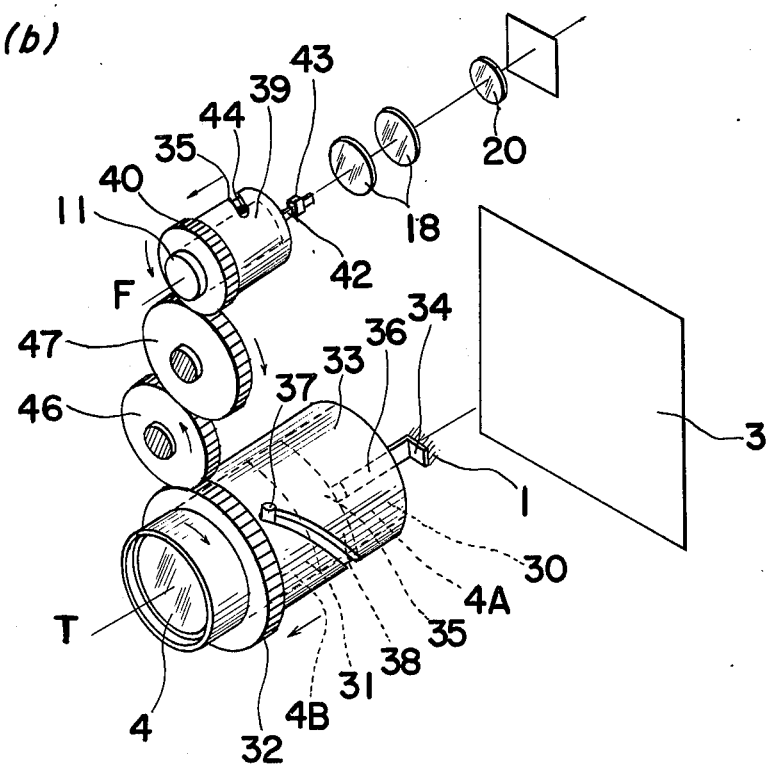

If the front lens assembly 4B and second optical system 11 have different focal lengths, forward and rearward movement thereof is suitably effected by a draw tube arrangement associated with drive transmission gears such as shown in FIG. 4(a) and FIG. 4(b), to which reference is now had. The rear lens assembly 4A and front lens assembly 4B of the first optical system 4 are respectively mounted in a tube 30 and a tube 31 which have identical diameters. The tubes 30 and 31 are slidably supported in a support tube 33 which is mounted in a camera interior portion (not shown) in such a manner that it may rotate freely about, but may not move forwardly or rearwardly along the optical axis T of the first optical system. The support tube 33 has a front end on which a large ring flange 32 having an outer peripheral surface formed with gear teeth is rigidly mounted. To the rear end portion of the rear lens assembly tube 30 there is fixedly attached a rearwardly extending plate element 34 which has a bent rear-end portion fixedly attached to a camera interior wall portion and maintains the tube 30 and, hence, rear lens assembly 4A in a fixed position. Fixedly attached to a rear edge portion of the front lens assembly tube 31 is a rearwardly extending narrow plate 35 which fits slidably in a groove 36 defined on the external surface of the rear lens assembly tube 30. This plate 35 acts to prevent rotation of the front lens assembly tube 31 in the support tube 33. A guide pin 37 which is fixedly attached to and extends radially from the outer surface of the forward lens assembly tube 31 is engaged in a guide slot 38 formed in the support tube 33. When the support tube 33 is rotated, the drive wheel 17, shown in FIG. 3, engaging and driving the support tube flange 32, the front lens assembly tube 31 is compelled to move within the support tube 33 because of the engagement of the pin 37 in the slot 38, the tube 31 being moved forwards if the tube 33 is rotated clockwise as seen in the drawing.

The second optical system is fixedly mounted in a tube 39, the optical axis F of the second optical system 11 coinciding with the longitudinal axis of the tube 39. The tube 39 is slidably mounted in a support tube 41 which is rotatably mounted in a camera portion in the same manner as the support tube 33, and has attached to the front end portion thereof a flange 40 having an external peripheral surface formed with gear teeth. Extending from the outer surface of the tube 39 is a guide pin 44 which is engaged in a guideway slot 35 formed in the support tube 41. Attached to and extending rearwardly from the rear end of the tube 39 is a narrow plate element 42 which is slidingly supported by a generally square U-shaped element 43 fixedly attached to a camera interior wall portion. This plate element 42 permits sliding motion of but prevents rotatory motion of the tube 39 in the support tube 41. The second optical system 11 is thus moveable forwardly or rearwardly without rotation when the support tube 41 is rotated.

The flange 40 of the support tube 41 is connected to the flange 32 of the support tube 31 via a gear 46 and gear 47 whereby the support tube 41 is rotated simultaneously with the support tube 31. The ratio of displacement of the front lens assembly 4B to that of the second optical system 11 during such rotation is made proportional to the focal lengths thereof. This may be easily achieved by selecting suitable ratios of gear transmission with reference to the diameter of the support tubes 33 and 41, examples of values of displacements for given amounts of rotation of the tubes 33 and 41. Needless to say, the drive wheel 17 or similar means may act on the support tube flanges 32 and 40 via individual gear systems, or the front lens assembly 4B and second optical system 11 may be fixedly mounted in unitary elements which are moveable by rack and pinion arrangements.

While several preferred embodiments of the present invention have been described in detail above, various modifications, are apparent to those skilled in the art. There is no intention therefore of limitation of the invention to the exact details shown and described.

What is claimed is:

1. A photographic camera which comprises, in combination:
    first and second focusing optical systems of different focal length, one of said first and second optical systems being used for directing rays of light, carrying an image of an object to be photographed, towards a photosensitive material and the other of said first and second optical systems being used for directing said rays of light towards a viewfinder arrangement for finding the position of the focal point of said one of said first and second optical systems;
    said first optical system including a movable lens assembly and a fixed lens assembly optically aligned with said movable lens assembly, said movable and fixed lens assemblies having a common optical axis directed towards the object to be photographed;
    said second optical system composed only of a movable lens assembly having an optical axis directed towards the object to be photographed and also having a focal length equal to the focal length of said movable lens assembly of said first optical system;
    means for moving one of said movable lens assembly of said first optical system and said movable lens assembly of said second optical system in a direction towards and away from the object to be photographed; and
    linkage means for transmitting the movement of said either one of said movable lens assembly of said first optical system and said movable lens assembly of said second optical system to the other of said movable lens assembly of said first optical system and said movable lens assembly of said second optical system thereby to cause said other of said movable lens assembly of said first optical system and said movable lens assembly of said second optical system to move along its optical axis a distance equal to the distance of movement of said either one of said movable lens assembly of said first optical system and said movable lens assembly of said second optical system, the image of the object being focused on the photosensitive material when the same image of the object is visually sharply represented to the eyes of a photographer through the viewfinder arrangement.

2. The camera as claimed in claim 1, wherein said one of said first and second optical systems is the first optical system while the other of said first and second optical systems is the second optical system.

3. The camera as claimed in claim 1, wherein said one of said first and second optical systems is the second optical system while the other of said first and second optical systems is the first optical system.

4. The camera as claimed in claim 1, wherein said first optical system has a focal length greater than that of said second optical system.

5. The camera as claimed in claim 2, further comprising a relay lens assembly and an eyelens both constituting said viewfinder arrangement together with said second optical system.

6. The camera as claimed in claim 2, further comprising a screen on which the image of the object transmitted through said second optical system is focused at the time the same image of the object transmitted through said first optical system is focused on the photosensitive material.

7. The camera as claimed in claim 2, wherein said fixed lens assembly of said first optical system is comprised of three lens elements aligned with each other.

8. The camera as claimed in claim 1, wherein said linkage means includes means for integrally connecting said first and second optical systems with each other.

9. The camera as claimed in claim 8, wherein said integrally connecting means is a lens board.

10. The camera as claimed in claim 9, wherein said moving means includes a drive element accessible to the hand of an operator of the camera for manipulation thereof.

11. The camera as claimed in claim 1, wherein the movable lens group of said first optical system is the front lens element nearest the object.

12. In a camera having interior portions defining a first portion for accommodation of photosensitive film material at an exposure station and transmission thereonto of image-wise light and a second portion separated by lightproof camera portions from said first portion and comprising an entrance portion and an exit portion for transmission of light respectively into and out of said second portion, said entrance portion being located at a forward part of said second portion and said exit portion being viewable from the exterior of said camera, focus adjustment and determination means comprising
    first optical system having a first optical axis, provided in a forward part of said camera first portion, able to direct imagewise light onto said film material at said exposure station, and comprising a forward lens assembly and a fixed rear lens assembly;
    first carrier means having said forward lens assembly fixedly mounted therein, said first carrier means defining external thread portions and movable forwardly and rearwardly with respect to said camera away from and towards said film material at said exposure station;
    first guide means which connects to said first carrier means, said first guide means being constituted by a ring element which is freely rotatable in a fixed plane normal to said first optical axis and defines external thread portions and internal thread portions engaging said first carrier means external thread portions, said first guide means being actuable to cause said first carrier means to move in said forward and rearward movement, and constrains said first carrier means to remain in line with said first optical axis during said movement thereof;

rotatable ring means defining external thread portions engaging said external thread portions of said first guide means;

second optical system provided at said entrance portion of said camera second portion, able to direct image-wise light into said camera second portion, and having a second optical axis which is parallel to said first optical axis and a focal length which is equal to that of said forward lens assembly of said first optical system;

image-viewing element provided at said exit portion of said camera second portion;

optical relay means positioned to receive image-wise light transmitted into said camera second portion by said second optical system, and able to transmit said image-wise light to said image-viewing element;

second carrier means having said second optical system fixedly mounted therein and moveable forwardly and rearwardly with respect to said camera;

second guide means which constrains said second carrier means to remain in line with said second optical axis during said movement thereof, whereby said first optical axis and said second optical axis remain parallel during said movement of said first carrier means and said second carrier means transporting said forward lens assembly and said second optical system;

drive means connecting to said first guide means and actuable to cause said first guide means to move said first carrier means in said forward and rearward movement;

connection and drive transmission means providing connection between said first carrier means and said second carrier means and being manually actuable to cause said second carrier means to move forwardly and rearwardly simultaneously with, and be displaced an amount proportional to the displacement of said first carrier means, said first carrier means and said second carrier means and said connection and drive transmission means being in rigid and integral connection, and said second guide means is a shaft means extending rearwardly from and fixedly attached to said connection and drive transmission means and is slidably supported in a fixed camera internal portion, whereby actuation of said drive means causes equal displacement of said forward lens assembly and said second optical assembly.

* * * * *